United States Patent [19]
Fallon et al.

[11] 4,394,611
[45] Jul. 19, 1983

[54] METHOD FOR CHARGING A STORAGE BATTERY

[75] Inventors: William H. Fallon, Cleveland; William R. Schober, Avon Lake, both of Ohio; Edward O. Neukirch; Donald W. Kirby, both of Reading, Pa.

[73] Assignee: General Battery Corporation, Reading, Pa.

[21] Appl. No.: 198,341

[22] Filed: Oct. 20, 1980

[51] Int. Cl.³ .............................................. H02J 7/00
[52] U.S. Cl. ...................................... 320/21; 320/23; 320/37; 320/39
[58] Field of Search ................................ 320/21–24, 320/39, 40, 37, 38

[56] References Cited

U.S. PATENT DOCUMENTS

| | | | |
|---|---|---|---|
| 3,090,904 | 5/1963 | Jensen | 320/22 |
| 3,178,629 | 4/1965 | Saslow | 320/23 |
| 3,510,746 | 5/1970 | Furuishi et al. | 320/21 X |
| 3,944,904 | 3/1976 | Hase | 320/23 |
| 4,016,473 | 4/1977 | Newman | 320/14 |
| 4,061,956 | 12/1977 | Brown et al. | 320/21 X |
| 4,237,411 | 12/1980 | Kothe et al. | 320/21 |

*Primary Examiner*—R. J. Hickey
*Attorney, Agent, or Firm*—Benasutti and Murray

[57] ABSTRACT

A method for charging a lead-acid storage battery, the method comprising the steps of charging the battery at an initially high rate during an initial stage of the charging cycle, monitoring the internal battery voltage, charging the battery at a lower, finishing rate after a preselected battery voltage has been monitored, and periodically interrupting the finishing charge until the battery is recharged.

21 Claims, 2 Drawing Figures

METHOD FOR CHARGING A STORAGE BATTERY

BACKGROUND OF THE INVENTION

This invention relates generally to a method for automatically charging storage batteries, and in particular, for automatically charging lead-acid storage batteries in a safe and efficient manner.

It is well known that during the process of charging lead-acid storage batteries, particularly during the terminal stages of the charging process, chemical reactions occur within the cells of the storage battery which produce gases which generally escape to the surrounding atmosphere, creating an irritating and unsafe environment in which to work. In order to reduce such "gassing", the charging current level used is generally lowered, particularly during the final stages of the charging process, to a value substantially below that which would permit recharging to take place in a minimum amount of time. In most cases, particularly when the initial battery voltage is low, the maximum charging current permissible during the final or finishing stages of charging is generally maintained at a rate as low as one tenth of that which would be permissible during the initial stage.

Failure to follow this practice can create both excessive quantites of gas emissions, as well as excessive temperatures within the battery. These problems, if unchecked, can lead to excessive water loss, plate buckling and other deleterious effects within the battery.

One apparatus which has been used to reduce these problems, while also maintaining a sufficient charging rate, is known as a taper charger. A taper charger generally comprises a transformer, a rectifier and an impedance, which impedance causes the charging current of the charger to fall as the output voltage increases, thus avoiding the above mentioned effects. Although taper chargers are relatively safe devices, such a tapered output provides, for most batteries, a less than optimum variation during the charging process.

Another process, known as the two rate method, has also been used. In practicing this method, the charging current is maintained at a constant, maximum value throughout the early portion of the charging process, and reduced comparatively steeply toward the end of the charging cycle when gassing is most prevalent.

Various other charging methods have been proposed for stablizing or controlling charge current rates. One proposed charging method comprises three stages. During the first stage of the process, a relatively high charging rate is used, during which stage the current is held constant against variations in line or battery voltages, or other factors. During the second stage of the process, which starts when the battery is gassing at a moderate rate and has reached a predetermined voltage, typically 2.35 volts per cell in the case of a lead-acid battery, the battery voltage is held constant and the charging current is diminished. During the final stage of the charging process, when the charging current has dropped to a predetermined finishing rate, the current is held constant at the finishing rate until the charge is terminated by a timing device, which continues for a duration based upon either a total charge time, or a predetermined charge time at the finishing rate.

Other attempts have recently been made to overcome the above mentioned problems. For example, in U.S. Pat. No. 4,146,839, issued Mar. 27, 1979, the achievement of a preselected voltage value, typically 2.35 volts per cell, is used to trigger an internal staircase function which automatically drops the voltage, as well as the input charging current, periodically until the finishing current is reached and the battery achieves its final output voltage. However, this procedure has not been found to be entirely satisfactory when the total charging time, or total gas emission, are considered to be important factors.

However, these factors are often critical to the proper operation of certain pieces of equipment. It is also often desirable to reduce the charging time as much as possible, often to a time which is substantially below the standard 8 hour time period typically required for charging larger batteries. It is also generally desirable to limit the quantity of gases emitted during the charging cycle since this not only serves to reduce a substantial explosion hazard, but also reduces the frequency with which water which must be added to the cells of the battery to maintain the electrolyte volume at the level required for satisfactory performance. Lastly, it is at all times desirable to keep the internal battery temperature as low as possible to avoid thermally stressing the components comprising the battery.

One method which has been proposed to obtain a safe and effective charging rate which can fully charge a battery in a relatively short period of time is described in a report published in the Soviet Journal of Technical Economic Information, Vol. 1, p. 5 (1977), by Maslov and Lisovskij. In performing this method, an initially high, constant current rate is applied to the battery. When the final, finishing stage is reached, a finishing charge is applied to the battery. Also during the finishing stage, the battery is periodically discharged. Described is a discharge rate having a duration of a few seconds and occurring at intervals of approximately 5 minutes. Although such a method appears to provide improved results, as well as substantially reducing charging time, the apparatus required and described in the article for accomplishing this method is both bulky and expensive.

It therefore becomes desirable to develop a method which satisfies the aforementioned problems and which permits a relatively short charging time, but which does not require the use of bulky, complex or expensive equipment.

SUMMARY OF THE INVENTION

In accordance with the present invention, a two stage charging method is provided. During the initial stage, a high capacity, constant current supply is used to charge the battery until such time as the battery reaches a selected threshold voltage, and has achieved a moderate gassing rate. When this condition is reached, the second, finishing stage commences, during which stage the charging current is automatically dropped to approximately ⅓ of that used during the initial charging stage. During finishing, the current is gradually diminished by following a modified, standard taper sequence, to approximately one tenth of that used during the initial charging stage. However, in accordance with the present invention, this sequence is performed in a series of repetitive cycles during which the charging rate is sequentially maintained and interrupted. In doing so, it has been found that the charging time for a typical industrial storage battery can be substantially reduced from that which would be required by standard, commercially available heavy duty battery chargers, with notable reductions in both gassing and internal temperature rise within the battery. Moreover, these improvements are provided using a method which merely interrupts the current being applied to the battery (unlike the method of Maslov and Lisovskij which requires actual discharging of the battery), permitting the use of less complex equipment.

Accordingly, it is the primary object of the present invention to provide an improved method for charging industrial storage batteries.

It is a further object of the present invention to provide a method for charging storage batteries which reduces the amount of time required to charge the battery.

It is a further object of the present invention to provide a method for charging storage batteries which reduces the amount of gassing occuring during the charging process.

It is a further object of the present invention to provide a method for charging storage batteries which reduces the internal temperature of the battery during the charging process.

It is a further object of the present invention to provide a method for charging storage batteries which can be implemented at a low cost.

Other objects, advantages and novel aspects of the invention will become apparent upon consideration of the following detailed description, taken in conjunction with the following illustrations.

DETAILED DESCRIPTION OF THE SUBJECT INVENTION

Figure 1:
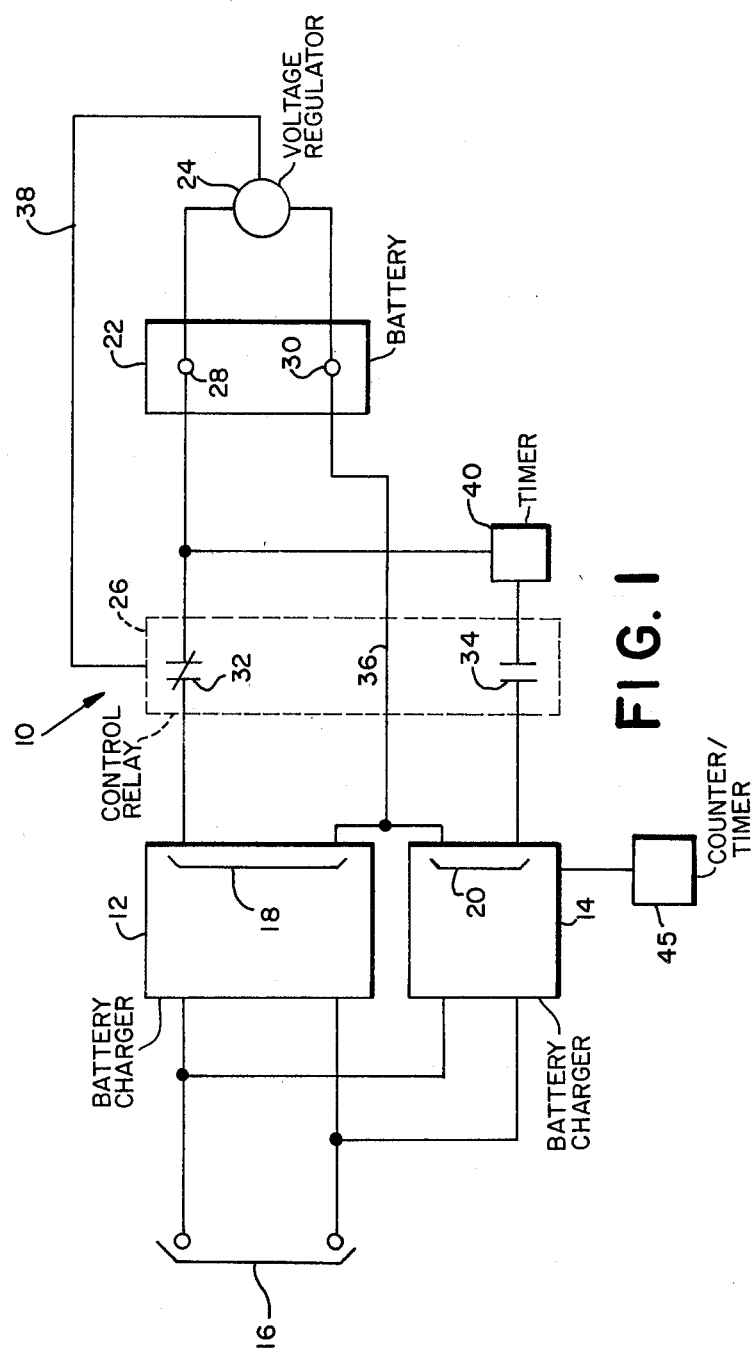
FIG. 1 is a block diagram illustrating the method of the present invention.
Figure 2:
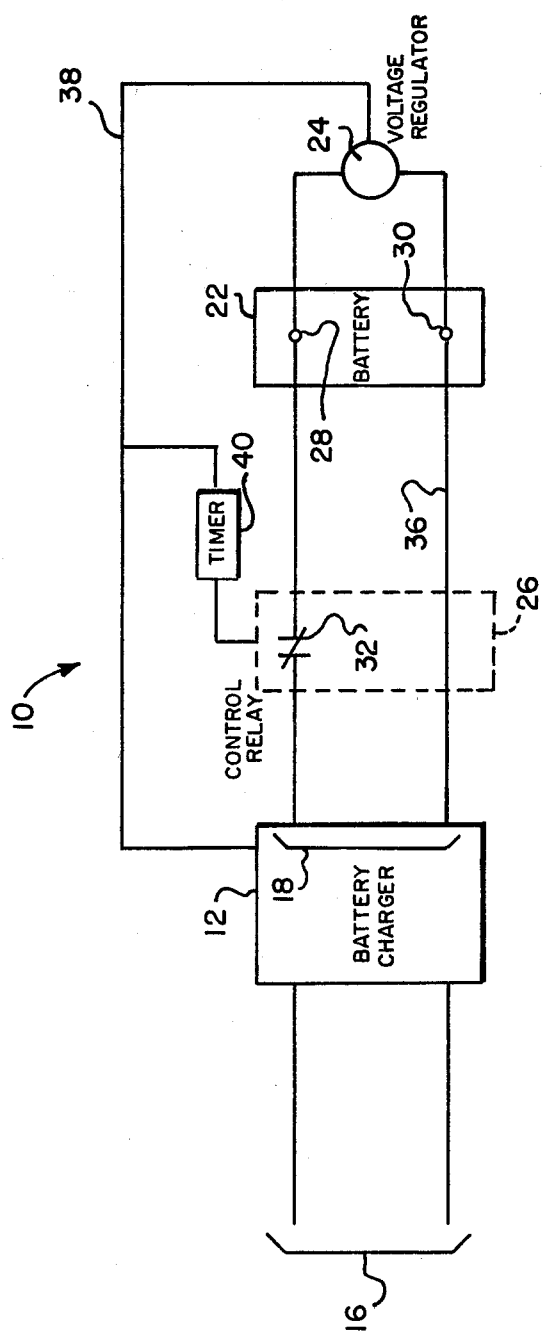
FIG. 2 is a block diagram illustrating an alternative method of the present invention.

Referring now to FIG. 1, the preferred manner in which the present method may be carried out is diagrammatically illustrated. As shown, this generally comprises providing a pair of battery chargers 12 and 14, which are connected in parallel, and which are operated in conjunction with a control system 10, the details of which will be more fully described hereinafter.

Charger 12 is preferably a high capacity, constant voltage ferroresonant taper unit capable of providing a charge rate on the order of 35-40 amperes/100 ampere hour battery capacity, and is used for the initial stage of the charge cycle. Charger 14 is preferably a lower capacity unit capable of providing a charge rate on the order of about 10 amperes/100 ampere hour capacity and having a constant voltage taper output, and is used for the finishing stage of the charge cycle. Chargers 12, 14 are preferably operated from a conventional AC line 16. The respective outputs 18, 20 of chargers 12, 14 are connected in parallel across a battery 22 to be charged.

The control system 10 used to regulate the charging cycle generally comprises a voltage regulator 24 and a control relay 26. Voltage regulator 24 is adapted to monitor the cell voltage of a battery 22 being charged, by monitoring the voltage drop across the battery terminals 28, 30. In response to this sensing, regulator 24 operates the control relay 26; the normally closed contacts 32 of which connect the output 18 of charger 12 to the positive terminal 28 of the battery 22; the normally open contacts 34 of which connect the output 20 of the charger 14 to the positive terminal 28 of the battery 22. A common return 36 is provided, completing the circuit comprising the control system 10.

Initially, voltage regulator 24 will sense a voltage across the terminals 28, 30 of battery 22 which is less than a predetermined threshold value. During the initial stage of the charging cycle, the output 18 of charger 12 is connected to the terminals 28, 30 by the normally closed contacts 32 of relay 26, and the return 36. Accordingly, the battery 22 will begin to charge at an initially high rate. Normally, this will continue for approximately 2-6 hours, depending upon the initial condition of the discharged battery.

As the battery 22 begins to accept its charge, the voltage regulator 24 will sense an increase in the voltage drop across the terminals 28, 30. When a preselected voltage level, generally lying within the range between 2.30 and 2.37 volts per cell, is reached, the voltage regulator 24 will cause the relay 26 to operate, via line 38, opening the contacts 32, and closing the contacts 34. This disconnects the output 18 of charger 12 from the battery terminals 28, 30, and connects the output 20 of the charger 14 to the battery, commencing the finishing stage of the charge cycle.

Working in conjunction with charger 14 is a timer 40 adapted to periodically interrupt the current supplied by charger 14 at selected intervals. A variety of devices may be used in conjunction with the timer 40 to accomplish this function. For example, timer 40 may be used to switch the charger 14 on and off at the selected intervals. Timer 40 may also be used to connect and disconnect the output 20 of charger 14 from the battery terminals 28, 30, and so forth. The ratio of on-time to off-time may be varied, however in a preferred mode a 5 minute on-time followed by a 1 minute off-time has been found suitable.

This cycling will continue until the final (fully charged) cell voltage is sensed across the battery terminals 28, 30. Voltage regulator 24 may then advantageously be used to shut down the battery charging system, preventing damage to the battery which could result from overcharging. It is also possible, although less desirable, to terminate operation of the battery charging system after a selected number of cycle interruptions have been counted by a counting means 45, rather than in response to the sensed voltage.

In some applications, the use of a "straight time" termination method is desirable. If so, the present invention may provide such a capability utilizing a separate timer 45 which is capable of terminating charging in response to a selected overall time setting. Alternatively, a time-voltage termination method may be used. For this, a separate timer 45 is caused to begin operation after a predetermined voltage, generally 2.37 volts per cell, is reached. The timer then terminates charging after a selected interval of time has passed, generally 3-5 hours.

EXAMPLE 1

The method previously described was used in conjunction with a 450 ampere hour test battery which was charged from 80% to 106% of its total capacity. It was found that gas evolution was reduced between 75% to 80% from that encountered using a conventional charging system during a conventional 8 hour charging cycle. Furthermore, the internal temperature rise within the battery was held to only 17° F., some 8°-10° F. lower than that normally experienced with conventional charging systems, serving to lower thermal stresses on the pasted oxides so that their tendency to crack and fail during charging and heavy service is considerably lowered. During this test procedure, the total charging time was not significantly reduced as compared to the standard (8 hour) charging cycle. However, the lower gas output served to considerably extend the amount of time before make-up water had to be added to the cells of the battery.

Although the foregoing method and apparatus serve well to provide the several objectives previously set forth, it will be understood that various alternative embodiments may be provided which produce similar results.

For example, it is not necessary that the control system 10 switch the charge rate by alternately operating the chargers 12, 14 as previously described. It is also possible for the control system 10 to initially operate both of the chargers 12, 14 simultaneously, so that the initial charge rate is determined by the sum of their outputs 18, 20, rather than solely by the output 18 of the charger 12. The finishing charge rate may then advantageously be provided by switching the charger 12 off while continuing operation of the charger 14, again utilizing the voltage regulator 24 and relay 26. In doing so, the need for the contacts 34 of the relay 26 is eliminated. The finishing charge rate would then continue until completed, at which time the control system 10 would discontinue operation as previously described.

Improvements of the type previously described can also be achieved using an apparatus including only a single battery charger, if desired. In doing so, the control system 10 is again regulated by a timer 40, however, in this situation the timer 40 is only actuated after the charger 12 is caused to automatically shift to the finishing cycle.

EXAMPLE 2

The method previously described was used in conjunction with a singly battery charger in which both rate tapers used were ferroresonant. The initial charging rate was 35–40 amperes/100 ampere hour battery capacity, which was continued until the cell voltage reached approximately 2.37 volts per cell. At that time, the finishing stage was commenced and the charging rate was reduced to 10–15 amperes/100 ampere hours. The finishing stage was caused to proceed through a duty cycle having a 5 minute on-time and a 1 minute off-time. This was found to result in a gas reduction of about 12%, and an overall temperature rise of about 19° F. However, in this case, the total recharging time was reduced, requiring approximately 6 hours, as compared to a standard 8 hour charging cycle.

Thus, it is seen that the present invention affords a substantial improvement in battery charging technique. As described, the lowered gas rate and temperature rise contribute to longer operating life and lower maintenance requirements for the battery. The shortened charge time offers the potential for recharging a storage battery in a period of time which is less than a normal 8 hour shift, thus reducing the number of standby and back-up batteries needed to assure the continued operation of battery powered equipment during a given shift, leading to improved efficiency and lower operating costs for such equipment.

Although the mechanism by which the gassing rate and internal battery temperature are reduced is not fully understood, and not wishing to be bound by such an explanation, it is believed that these reductions may be due to the removal of monatomic hydrogen and oxygen from the vicinity of the battery plates, which elements possibly subsequently recombine as water.

It will be understood that various changes in the details, materials and arrangement of parts which have been herein described and illustrated in order to explain the nature of this invention, may be made by those skilled in the art within the principle and scope of the invention as expressed in the following claims.

What is claimed is:

1. A method for charging a storage battery, the method comprising:
    a. charging the battery at a first rate during a first portion of a charging cycle;
    b. charging the battery at a second rate, lower than the first rate, during a second portion of the charging cycle; and
    c. periodically interrupting the charging, at fixed, timed intervals, during the second portion of the charging cycle;
    d. wherein the interruption of the charging cycle defines a duty cycle wherein approximately one sixth of the charging cycle is interrupted during the second portion of the charging cycle.

2. The method of claim 1 wherein the second rate is approximately one third of the first rate.

3. The method of claim 2 wherein the second rate is initially approximately one third of the first rate, and thereafter tapers to approximately one tenth of the first rate.

4. The method of claim 1 wherein the duty cycle comprises approximately five minutes wherein the battery is charged at the second rate, and approximately one minute wherein the charging of the battery is interrupted.

5. The method of claim 1 further comprising switching the charging from the first rate to the second rate in response to the battery voltage.

6. The method of claim 5 wherein the charging rate is switched when the battery voltage attains a level lying within a range substantially between 2.30 and 2.37 volts per cell.

7. The method of claim 1 wherein the battery is charged at the first rate using a constant voltage, ferroresonant battery charger.

8. The method of claim 7 wherein the battery is charged at the second rate using a constant taper voltage charger.

9. The method of claim 1 wherein the battery is charged at the first and second rates using a single ferroresonant battery charger.

10. A method for applying a finishing charge to a storage battery, the method comprising:
    a. charging the battery at a finishing rate during finishing portions of a charging cycle; and
    b. periodically interrupting the charging, at fixed, timed intervals, during the finishing portions of the charging cycle;
    c. wherein the interruption of the charging cycle defines a duty cycle wherein approximately one sixth of the charging cycle is interrupted during the finishing portions of the charging cycle.

11. The method of claim 10 wherein the finishing rate is a tapered rate.

12. The method of claim 11 wherein the finishing rate tapers downwardly to approximately one tenth of an initial charging rate preceeding the finishing charging.

13. The method of claim 10 wherein the duty cycle comprises approximately five minutes wherein the battery is charged at the finishing rate, and approximately one minute wherein the charging of the battery is interrupted.

14. The method of claim 10 further comprising automatically terminating the charging at the finishing rate after the battery has been fully charged.

15. The method of claim 14 wherein the termination is responsive to the battery voltage.

16. The method of claim 14 wherein the termination is responsive to a counted number of cycle interruptions.

17. The method of claim 14 wherein the termination is responsive to a selected overall time setting.

18. The method of claim 17 wherein the selected overall time setting commences after the battery has reached a selected voltage.

19. The method of claim 18 wherein the selected voltage is about 2.37 volts per cell.

20. A method for charging a storage battery, the method comprising:
 a. charging the battery at a first rate during a first portion of a charging cycle;
 b. charging the battery at a second rate, which is approximately one third of the first rate, during a second portion of the charging cycle; and
 c. periodically interrupting the charging, at fixed, timed intervals, during the second portion of the charging cycle;
 d. wherein the timed interruption of the charging cycle defines a duty cycle wherein approximately one sixth of the charging cycle is interrupted during the second portion of the charging cycle.

21. The method of claim 1 or 20 wherein the fixed, timed intervals are constant, timed intervals.

* * * * *